United States Patent
Jones et al.

(10) Patent No.: US 8,914,375 B2
(45) Date of Patent: Dec. 16, 2014

(54) METHOD AND SYSTEM FOR MATCHING APPROPRIATE CONTENT WITH USERS BY MATCHING CONTENT TAGS AND PROFILES

(75) Inventors: Gregory L. Jones, Warren Center, PA (US); Brian N. Phoenix, Binghamton, NY (US); Ralph Tamlyn, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 13/614,264

(22) Filed: Sep. 13, 2012

(65) Prior Publication Data
US 2013/0074009 A1    Mar. 21, 2013

Related U.S. Application Data

(63) Continuation of application No. 10/832,322, filed on Apr. 27, 2004, now Pat. No. 8,386,488.

(51) Int. Cl.
G06F 7/00    (2006.01)
G06F 17/30    (2006.01)

(52) U.S. Cl.
CPC .............................. *G06F 17/30324* (2013.01)
USPC .......................... 707/738; 707/739; 707/740

(58) Field of Classification Search
USPC ........................................ 707/738, 739, 740
See application file for complete search history.

(56) References Cited

U.S. PATENT DOCUMENTS

| | | | |
|---|---|---|---|
| 5,585,866 A | 12/1996 | Miller et al. | |
| 5,724,567 A | 3/1998 | Rose et al. | |
| 6,112,192 A | 8/2000 | Capek | |
| 6,134,532 A * | 10/2000 | Lazarus et al. | 705/14.25 |
| 6,138,142 A | 10/2000 | Linsk | |
| 6,167,441 A | 12/2000 | Himmel | |
| 6,185,614 B1 | 2/2001 | Cuomo et al. | |
| 6,236,991 B1 | 5/2001 | Frauenhofer et al. | |
| 6,263,352 B1 | 7/2001 | Cohen | |
| 6,266,649 B1 | 7/2001 | Linden et al. | |
| 6,330,592 B1 | 12/2001 | Makuch et al. | |

(Continued)

FOREIGN PATENT DOCUMENTS

WO    02063420 A2    8/2002

OTHER PUBLICATIONS

Notice of Allowance dated Oct. 23, 2012 for U.S. Appl. No. 10/832,322; 10 pages.

*Primary Examiner* — Mariela Reyes
(74) *Attorney, Agent, or Firm* — Lisa Ulrich; Roberts Mlotkowski Safran & Cole, P.C.

(57) ABSTRACT

A method and system is provided for classifying and labeling information content and also for profiling a user for accessing the information content, both using a coordinated labeling technique so that content from multiple sources may be searched, identified and/or presented to the user according to the user's profile. This technique provides an ongoing update of information content and sources while filtering out unnecessary information that is irrelevant to the user's profile, resulting in focused availability of information to the user. The user profile is matched with content of interest and matching content information may automatically be updated and made available to a user, in conformity with the user's profile. Content providers may now jointly use a common labeling scheme to improve the experience of their users and to provide content providers a technique to associate users with common facets of classification.

18 Claims, 13 Drawing Sheets

(56) References Cited

U.S. PATENT DOCUMENTS

| | | |
|---|---|---|
| 6,401,094 B1 | 6/2002 | Stemp et al. |
| 6,418,452 B1 | 7/2002 | Kraft et al. |
| 6,438,545 B1 | 8/2002 | Beauregard et al. |
| 6,438,579 B1 | 8/2002 | Hosken |
| 6,442,577 B1 | 8/2002 | Britton et al. |
| 6,484,149 B1 | 11/2002 | Jammes et al. |
| 6,564,260 B1 | 5/2003 | Baber et al. |
| 6,571,245 B2 | 5/2003 | Huang et al. |
| 2001/0032165 A1* | 10/2001 | Friend et al. .......... 705/37 |
| 2002/0013780 A1 | 1/2002 | Brown et al. |
| 2002/0077988 A1 | 6/2002 | Sasaki et al. |

* cited by examiner

FIG. 4

| USER_ID | CLASS AUD | GEO | REGION | CNTRY | SECT | IND | LANG | ROW_STATUS | LST_CHANGE_TM |
|---|---|---|---|---|---|---|---|---|---|
| johndoe@us.ibm.com | U Sect | Americas | | | Distr | Retail | Eng | New | 0001-01-01-00.00.00.000000 |
| johndoe@us.ibm.com | U Sect | Americas | | | Distr | | Eng | New | 0001-01-01-00.00.00.000000 |
| johndoe@us.ibm.com | U Sect | Americas | West | | Distr | Retail | Eng | New | 0001-01-01-00.00.00.000000 |
| johndoe@us.ibm.com | U Sect | Americas | West | | Distr | | Eng | New | 0001-01-01-00.00.00.000000 |
| johndoe@us.ibm.com | U Sect | Americas | Centr | | Distr | Retail | Eng | New | 0001-01-01-00.00.00.000000 |
| johndoe@us.ibm.com | U Sect | Americas | Centr | | Distr | | Eng | New | 0001-01-01-00.00.00.000000 |
| johndoe@us.ibm.com | U Sect | Global | | | Distr | Retail | Eng | New | 0001-01-01-00.00.00.000000 |
| johndoe@us.ibm.com | U Sect | Global | | | Distr | | Eng | New | 0001-01-01-00.00.00.000000 |

505 — • Audience
Select the group for which this item applies.
○ Communications  ○ Industrial
● Distribution  ○ Public
○ Financial Services  ○ SME EMEA

510 — • Industries
Select the industries for which this item applies.
Choose Here - Select All Industries
☐ Consumer Products
☑ Retail
☐ Travel with Transportation

515 — • Geographies
Publish in all geographies or specific ones only?
○ Global  ● Specific Geographies Only

520 — • Specific geographies
Select the specific geographies.
☑ Americas  ☐ Asia Pacific  ☐ EMEA

525 — • Regions
Publish in all regions of the geographies or specific ones only?
○ All locations  ● Specific Regions Only

530 — • Specific regions
To limit a geography to specific regions, select the regions for that geography here
(To publish in all regions of a specific geography, do not make any selections here for that geography.)
☑ Americas - Central - Central US
☐ Americas - East - Eastern US
☐ Americas - North - Canada
☐ Americas - South - Latin America
☐ Americas - West - Western US

535 — • Security classification
Select the classification of this item
● Unclassified  ○ IBM Confidential

540 — • Content type
● News  ○ Wins  ○ Alerts

FIG. 6A

| | CLASS | AUD | GEO | REGION | CNTRY | SECT C | SECT IND | LANG | CATEGORY | CONTENT_NAME | CONTENT_PATH | ROW_STATUS | LST_CHANGE_TM | URL |
|---|---|---|---|---|---|---|---|---|---|---|---|---|---|---|
| 607 | 605 | 610 | 615 | 620 | 625 | 630 | 635 | 640 | 645 | 650 | 655 | 660 | 665 | |
| 608a | Sect | U | Americas | Centr | | Distr | Retail | Eng | NewsAlerts | JDSE-5LPL3A.html | NonConf/NewsAlerts/JDSE-5LPL3A/ | New | 2004-04-01-06.13.01.000 | |
| 608b | Sect | U | Americas | Centr | | Distr | Retail | Eng | NewsAlerts | Image0.gif | NonConf/NewsAlerts/JDSE-5LPL3A/ | New | 2004-04-01-06.13.01.000 | |
| 608c | Sect | U | Americas | Centr | | Distr | Retail | Eng | NewsAlerts | Image1.gif | NonConf/NewsAlerts/JDSE-5LPL3A/ | New | 2004-04-01-06.13.01.000 | |
| 608d | Sect | U | Americas | Centre | | Distr | Retail | Eng | NewsAlerts | JDSE-5LPMsX.html | NonConf/ExpertContact/JDSE-5LPL3A/ | New | 2004-03-11-06.13.01.000 | |
| 608e | Sect | U | Americas | Centr | | Distr | Retail | Eng | NewsAlerts | Image0.gif | NonConf/ExpertContact/JDSE-5LPL3A/ | New | 2004-03-11-06.13.01.000 | |
| 608f | Sect | U | Americas | Centr | | Distr | Retail | Eng | NewsAlerts | Image1.gif | NonConf/ExpertContact/JDSE-5LPL3A/ | New | 2004-03-11-06.13.01.000 | |

| URL | URL_DESC | APP_CATEGORY | INTENDED_USE | ABSTRACT |
|---|---|---|---|---|
| ../NonConf/NewsAlerts/JDSE-5LPL3A/JDSE-5LPL3A.html | More retailers may look to start magazines | News | Customer Viewable | A magazine venture between X-Mart Stores and publisher X Inc. that is expected to be unveiled soon could help spawn a new generation of magazines sold exclusively at specific stores, such as clothing retailers or even restaurants, Industry experts say. XXX.com |

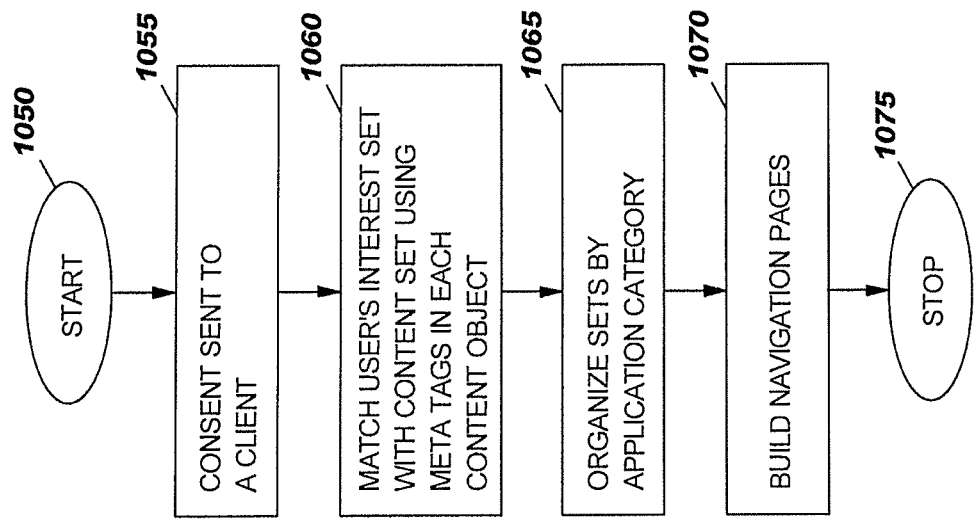

METHOD AND SYSTEM FOR MATCHING APPROPRIATE CONTENT WITH USERS BY MATCHING CONTENT TAGS AND PROFILES

CROSS-REFERENCE TO RELATED APPLICATIONS

This application is a continuation of U.S. application Ser. No. 10/832,322, filed on Apr. 27, 2004, the content of which is incorporated by reference herein in its entirety.

BACKGROUND OF THE INVENTION

1. Field of the Invention

The invention generally relates to providing customized content to a user and, more particularly, providing Web content to a user based on profiled user information and profiled Web content.

2. Background Description

A problem of content overload has become a burden to users of information in many situations. One current situation in which people face content overload is the World Wide Web, but the problem exists in other areas as well, such as, for example, books, magazines, libraries, and entertainment, both video and audio.

Current attempts to solve this problem originate with the content providers. Content providers find it expedient to organize and offer their content in collections suited to their needs and the array of content they offer, with limited attention to users' needs. Content providers therefore offer multiple independent sources (often web sites). This approach puts the burden on an individual to learn and understand all the sites/sources that may exist concerning a topic or concept. The individual typically must wade through vast collections of content to discover that which is of interest and then the individual typically is burdened with all that is necessary to maintain links or pointers to the collections of content of interest. Unfortunately, maintaining the links or pointers quickly becomes obsolete as the collections change, so the user is forced to relearn, update, and understand the sources again and again. Additionally, users often must also correlate information across the many sources/sites that are discovered with related information relevant to the user's needs.

On the World Wide Web, current solutions typically involve content providers creating their own web sites, sometimes more than one for different audiences even when those audiences and interests overlap. The sites typically have content the users want or need and users generally want content from the many sites. However, the sites have structures which may or may not be consistent, but users must nevertheless understand all the different structures. Users typically would prefer to take slices of content from across those sites, but they cannot do so and users cannot easily maintain links and pointers into those sites because the sites change continuously. Therefore, convenient access to the disassociated information is greatly inhibited and hinders ready identification and/or retrieval of the information, particularly since the content is rarely organized to provide uniform search and access to the disparate information based on users' profiles.

SUMMARY OF THE INVENTION

In an aspect of the invention, a method for providing information to a user is made available. The method comprises the steps of defining one or more user profile vectors (UPVs) based on user information and defining one or more content tagging vectors (CTVs) based upon content objects. The method also provides generating a list of matching content identifiers (MCIs) which is associated with relevant information content by comparing the UPVs and the CTVs and comparing the list of MCIs and providing the relevant content information based on a triggering event.

In another aspect of the invention, a method for managing content information is provided. The method comprises tagging user profile information as categories and tagging content information as categories. The method includes comparing the tagged user profile information and the tagged content information categories to determine a common set of categories and retrieving the content information associated with the common set of categories. Also included is the step of updating a user's workstation with the retrieved content upon a triggering event.

In another aspect of the invention, a method for providing categorized information to a user is provided. The method comprises the steps of tagging a user profile having descriptors of at least a user's interests and a user's responsibilities with at least one of a time stamp and one or more categories. Also included are the steps of providing information content by labeling one or more content objects and tagging the information content with a time stamp and the one or more categories, detecting a change in at least one of the user profile and the one or more content objects based on at least one of the time stamp and the one or more categories and updating a workstation based on the detected change.

In another aspect of the invention, a method for providing information to a user is provided. The method comprises developing user profile information with category tags, developing content profile information with category tags and comparing the combined set of tags to determine matching tags. The method includes retrieving the content associated with the matching tags and updating a workstation with the retrieved content based on a triggering event.

In another aspect of the invention a system for providing information to a user is provided. The system comprises a means for defining one or more user profile vectors (UPVs) based on user information and a means for defining one or more content tagging vectors (CTVs) based upon content objects. The invention also comprises a means for comparing the one or more UPVs and the one or more CTVs to generate a list of matching content identifiers (MCIs) which is associated with relevant information content and a means for providing the relevant content information based on a triggering event.

Another aspect of the invention includes a computer program product comprising a computer usable medium having readable program code embodied in the medium, the computer program product includes at least one component to tag a user profile having descriptors of at least a user's interests and a user's responsibilities with at least one of a time stamp and one or more categories and to provide information content by labeling one or more content objects and tagging the information content with a time stamp and the one or more categories. The component is also provided to detect a change in at least one of the user profile and the one or more content objects based on at least one of the time stamp and the one or more categories, and update a workstation based on the detected changes.

BRIEF DESCRIPTION OF THE DRAWINGS

FIG. 4 is an embodiment of resulting user profile categories shown in tabular format with supporting information, according to the invention;

FIG. 5 is an embodiment of a content publishing form for acquiring content categorization information, according to the invention;

FIGS. 6A and 6B are an embodiment of a content information table created to characterize a content object, according to the invention;

FIG. 11 is an embodiment of the invention showing steps of using categorization matching on a client.

DETAILED DESCRIPTION OF EMBODIMENTS OF THE INVENTION

The invention is directed to a method and system for classifying and labeling information content (e.g., sets or subsets of websites, databases, web pages, general content objects such as text articles, audio files, video files, or the like) and also for profiling a user (e.g., interests and/or responsibilities) for accessing the information content, both using a coordinated labeling and categorization technique so that content from multiple sources may be searched, identified and/or presented to the user according to the user's profile. This technique provides, in one embodiment, an ongoing update of information content and sources while at the same time filtering out unnecessary information that is irrelevant to the user's profile, resulting in more focused availability of content information to the user.

In one aspect of the invention, a technique provided by the invention matches user's interests as defined by a user profile with information content as tagged by content creators reflective of categories employed within a tagged user profile. The invention provides mechanisms to organize this information and automatically update current content information, even when the information changes. The system and method makes the updated content available to a user, in conformity with the user's profile. The invention also establishes techniques for content providers to associate users and information via common facets of classification.

An example of an application of this technique may be in matching users' interests/responsibilities (as defined by a profile) with content available on the World Wide Web. In one application, the content made available may be on one or more sites whose owners of the content are prepared to work together. However, any type of network and any number of content owners may be involved. The invention may also be applied in other areas as well, such as, for example, literature or video content information. The invention allows content providers to recognize their joint interest in working together to improve the experience of their users.

Figure 1:
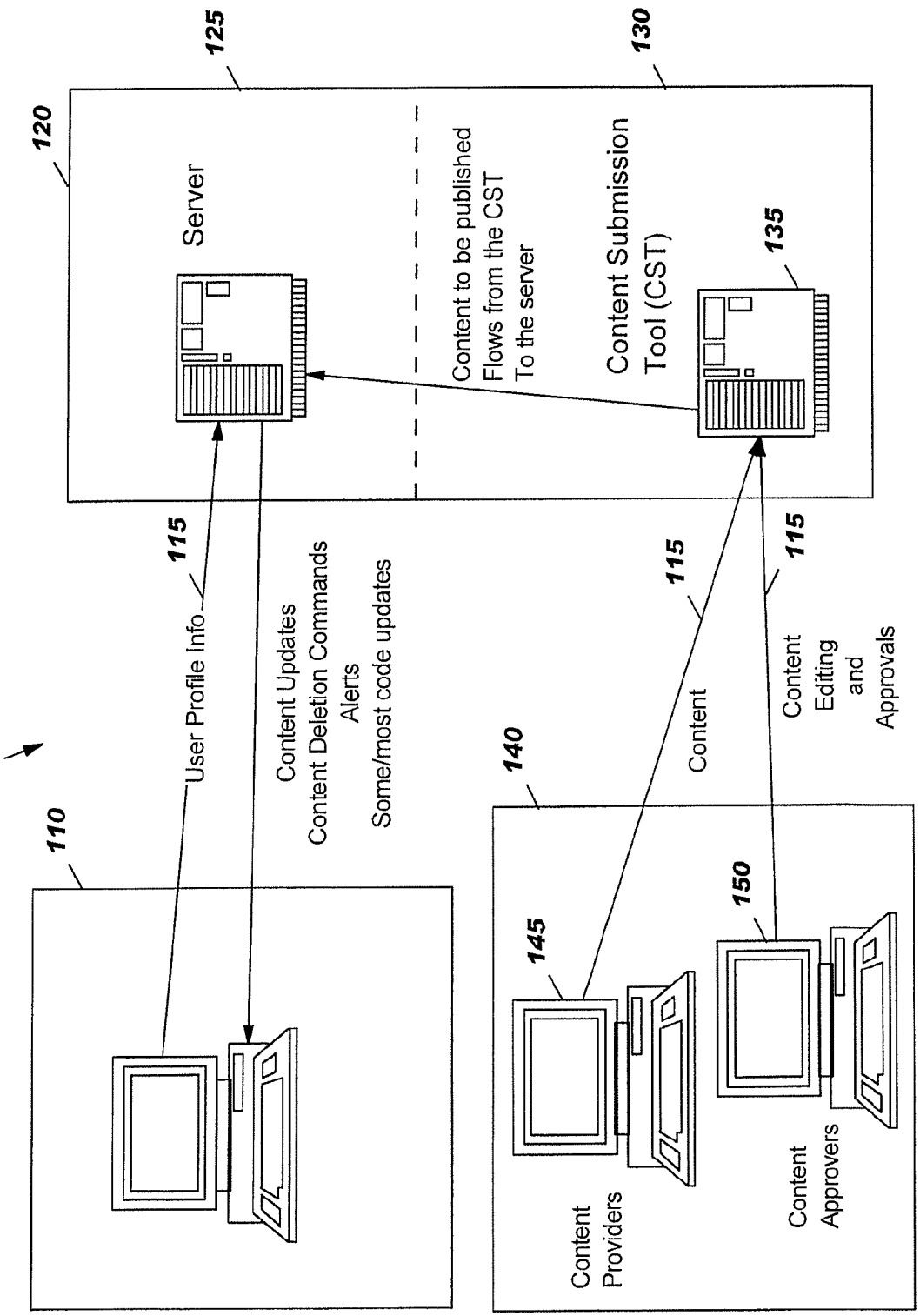
FIG. 1 is a block diagram of an embodiment of the invention.

FIG. 1 is a block diagram of an embodiment of the invention, generally denoted by reference numeral 100. The invention includes at least one user's workstation 110 (i.e., a client, a workstation, or client workstation) which typically has a memory device (for example, a hard drive, DVD drive, or the like). The user workstation 110 may be connected via a network 115 (e.g., a local area network (LAN), a wide area network (WAN), wireless network, or the Internet) to a server 120. Also included may be at least one content provider 140 which may comprise one or more content providers 145 and/or a content approver 150. In embodiments, the content provider 145 and content approver 150 may be the same entity and may also be a user workstation.

The server 120 may optionally comprise a plurality of servers 125 and 130. For illustrative purposes, server 125 is representative of content sources which one of ordinary skill in the art would recognize may be any number of servers and may be different content sources such as, for example, WebSphere, DB2 databases, local directory access protocol (LDAP), Web sites, or the like. Server 130 represents a server having content submission tool(s) for processing content submission (e.g., site publisher, content creation tools, or the like) and, in embodiments, may be a part of, or the same as, server 125.

According to the invention, a user profile may be created that profiles a user's interests or responsibility areas (for example, a user may be a financial trader responsible for aspects of the automotive industry in Europe and the United States, or the like). In this way, the profile succinctly provides a basis for tags that define the areas of content interest and/or responsibility area (in this example, finance, automotive, Europe and United States) which may be provided to the server 125.

Similarly, content providers 145 categorize/profile their content using a tagging technique (described more fully below) that is reflective and consistent with the profile tagging associated with the user profile. In embodiments, content approvers 150 may authorize creation or submission of the content provided by the content providers 145. A content submission tool 135, which may be resident on the server 130, provides for submission of new content, tagged according to the invention, for subsequent availability searching, update (including automatic update) and access by users. For explanation purposes, the user profiling and content profiling are each discussed independently and then as mutually cooperating aspects of embodiments of the invention.

Figure 2:
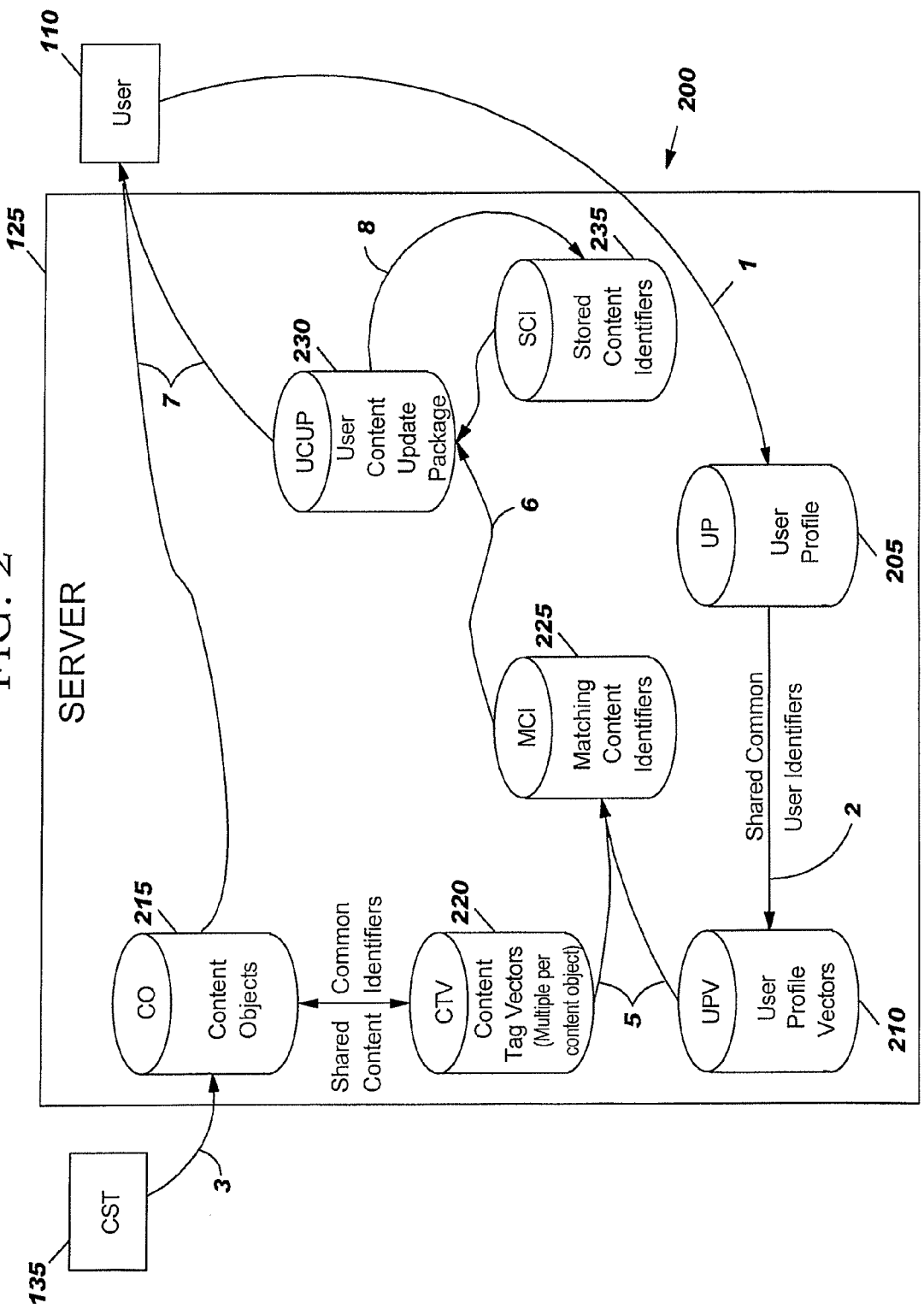
FIG. 2 is a block diagram of an embodiment of the invention.

FIG. 2 is a block diagram of an embodiment of the invention. FIG. 2 (as well as FIGS. 8-11) may also be representative of flow or state diagrams of embodiments showing steps of the invention. The steps of FIG. 2 are represented by reference numerals 1-8. The steps of FIG. 2 (as well as FIGS. 8-11) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM).

Referring to the embodiment of FIG. 2, generally denoted by reference numeral 200, the user workstation 110 is shown interacting with the server 125 when a user accesses or requests information content, such as for example, web sites or databases. Server 125 comprises several components including a user profile (UP) 205 that may be created at the user workstation 110 for defining the categories of the user's interest or responsibilities, and at step 1, uploaded to the server 125 when a user accesses information content (e.g., by logging onto the server, searching or submitting inquiries). At step 2, the user profiles 205 may be used to create user profile vectors (UPV) 210 which define categories and characteristics of a user's interest. These categories are pre-defined categories that may be used during the user profiling, and these categories are common to a similar categorization process used by content providers as described below. In embodiments, other components that may comprise server 125 include Content Objects (CO) 215, Content Tag Vectors (CTV) 220, Matching Content Identifiers (MCI) 225, User Content Update Package (UCUP) 230, and Stored Content Identifiers (SCI) 235.

User profiles 205 may be collected at various times, e.g., initial user access to new content, or by change in user responsibility assignments, or by a third party who has proxy influence with the user such as a human resources department, to "profile" a user and may include information concerning a user's geographic interests that is relevant to a user. This information may include, for example, what countries, states, continents, combinations, or other geographic subsets. Also, industry specific interests may be included which define the user's interest in one or more industries. His industry information may include, for example, automotive, financial, communications, educational, governmental, energy, or similar industries. In embodiments, expert contacts interest may also be included. Expert contacts are another example of a user's interest. For example, it may indicate the type of contact information the user wants to see in the content the user may be viewing. This may be analogous to help contacts in a website. An expert contact concerns matching the user with support experts to which the user is entitled. Experts typically are responsible to help certain groups of users (in this case, sales teams of the two types). The user profile captures a tag as to which group of experts that may be associated with the user.

In embodiments, any dimension of interest or relevance may be used. The examples used herein include industry and geographic relevance dimensions. Other examples may include content type, subject matter, technical topics, organization, organizational relationships, etc. The examples used herein also use an organizational relationship in matching expert contacts with users.

Typically, user profile vectors 210 establish a uniform categorization technique so that when a user subsequently initiates queries for information, the UPVs may automatically define and place bounds on the scope of a query to content information that may have also been categorized by the same categorization technique by content providers. Geographic and industry values, as defined in a user profile 205, may typically be combined to generate a full list of vectors that remain in effect until a user, or other catalyst such as a proxy influence, causes their profile to change. For example, if there were four geographic values and three industry values, there typically would be twelve profile vectors associated with the user (i.e., twelve UPVs). The vectors define a domain of information. By providing a profile by geographic and industry domain, or the like, information may be more easily monitored and retrieved for a given user based upon the user's needs, interests or responsibilities. This increases focus or awareness of information pertinent to a user while at the same time filtering unnecessary information for the user. User profiles may be acquired as discussed in relation to FIG. 3, below.

Still referring to FIG. 2, a content submission tool 135 may be used to acquire, create, update or delete content information by a content provider. The content submission tool 135 classifies and tags a content object (e.g., a unique component, file, image, attachment, any physical entity or part of an entity) for posting and availability, which may be a scheduled function at a regular interval or manually initiated. The categorization and tagging is similar to the process employed by the user profile sequence, described previously. The categories employed are common categories as used during the user profiling and categorization described previously. This tagging is maintained in a database so that each content object that is tagged may be located by matching known tags corresponding to tags in a user profile vector. Content categorization may be acquired, for example, with a content publishing form as discussed in relation to FIG. 5. At step 3, content objects 215 may be uploaded to server 125. At step 4, the content objects may be categorized and tagged to produce content tag vectors (CTV) 220 which parallels the categorization and tagging performed during a user profile sequence of steps 1 and 2, employing common categories.

At step 5, user profile vectors 210 and content tag vectors 220 are processed by matching corresponding tags in the user profile vectors 210 and content tag vectors 220 resulting in the generation of a comprehensive list of currently matching content identifiers 225 (MCI). If there is a match of tags then the content object associated with the comprehensive list of MCI is intended and provided to the user under certain conditions This step may be initiated due to a scheduled process (e.g., every three hours, once a day, or some other time period) or may be initiated on demand by a user (e.g., a user connected to server 125 and submission of a new profile or via a query). Any matching content identifiers (MCI) are reviewed for whether any new updates are required. This may be accomplished by comparing the "last update" time stamp on matching tags to discover whether either a change in user profile has occurred or a change to the content object has occurred relative to one another. Time stamp differences trigger updates to a user.

In embodiments, the values used in corresponding tag vectors, i.e., the profile vectors 210 or content tag vectors 220, may include "don't care" values so that a comparison always returns true, i.e., always a match. The "don't care" value may be particularly useful for hierarchical relationships to include more than one level of a hierarchy in a simple manner.

At step 6, based on any MCIs 225, at least one user content update package (UCUP) 230 is compiled based on the MCIs with differences in time stamps from those in the SCIs for the user and the MCIs which do not appear in the SCIs for the user. A UCUP 230 may be created for delivery to a user workstation 110 that is either currently on-line or associated with a known user or is queued for future delivery when the workstation 110 (or user) logs onto the network. In embodiments, a verification check (e.g., an audit) may be performed on a user's workstation 110 to verify the accuracy of the SCI 235 database. The SCI database typically mirrors the content that is on a user's workstation. A check may also be performed to verify that no confidential information is being included for a user with an unclassified rating. The UCUP 230 may also include deletion commands to delete information content on the user's workstation 110 that may be out-of-date or may no longer be pertinent to the user, for example, due to changes in a user's profile (e.g., new or changed responsibilities or interests).

At step 7, an UCUP 230 may be sent to the user's workstation 110 based on differences (by comparison) in an MCI and a stored content identifiers (SCI) of step 6. The SCI is reflective of what is currently on a user's workstation, such that updated information content including relevant content objects 215 may be delivered to the user. This makes current the information stored on the workstation 110, according to a user's profile. At step 8, the SCI may also be updated to reflect the latest update to the user's workstation.

Any step 1-8 may be performed either on a scheduled basis or on a demand basis. It should thus be understood that the components and accompanying steps of FIG. 2 may work independently or in combination. Also the numbering of the steps 1-8 should not be considered a limiting feature in that the order and performance of these steps do not necessarily have to be performed in the sequence of 1-8. One or more of the steps 1-8 may operate asynchronously or synchronously in relation to one another with queuing structures or other timing techniques employed as necessary.

For example, a user 110 may choose to cause an update to a profile and log onto the network, or, an automatic process may submit changes to a user's profile on a scheduled basis. Furthermore, it may be possible, for example, for an UCUP 230 to be delivered to a user's workstation 110 due to a scheduled update, followed immediately by another update to a change in a user's profile occurring slightly after the scheduled update, both in one user session. Also, queuing techniques may be employed to accommodate time based activity at any step. For example, a UCUP may be queued for delivery until a user logs on at workstation 110. Furthermore, the server 125 may re-initiate a process if the process does not complete, for example, if a user logs off before a complete UCUP has been delivered. It should now be apparent that updates to the user may be due to a triggering event which may include a user log-on, a scheduled process, a change in user profile, a difference in time stamps, and a change in content information.

Figure 3:
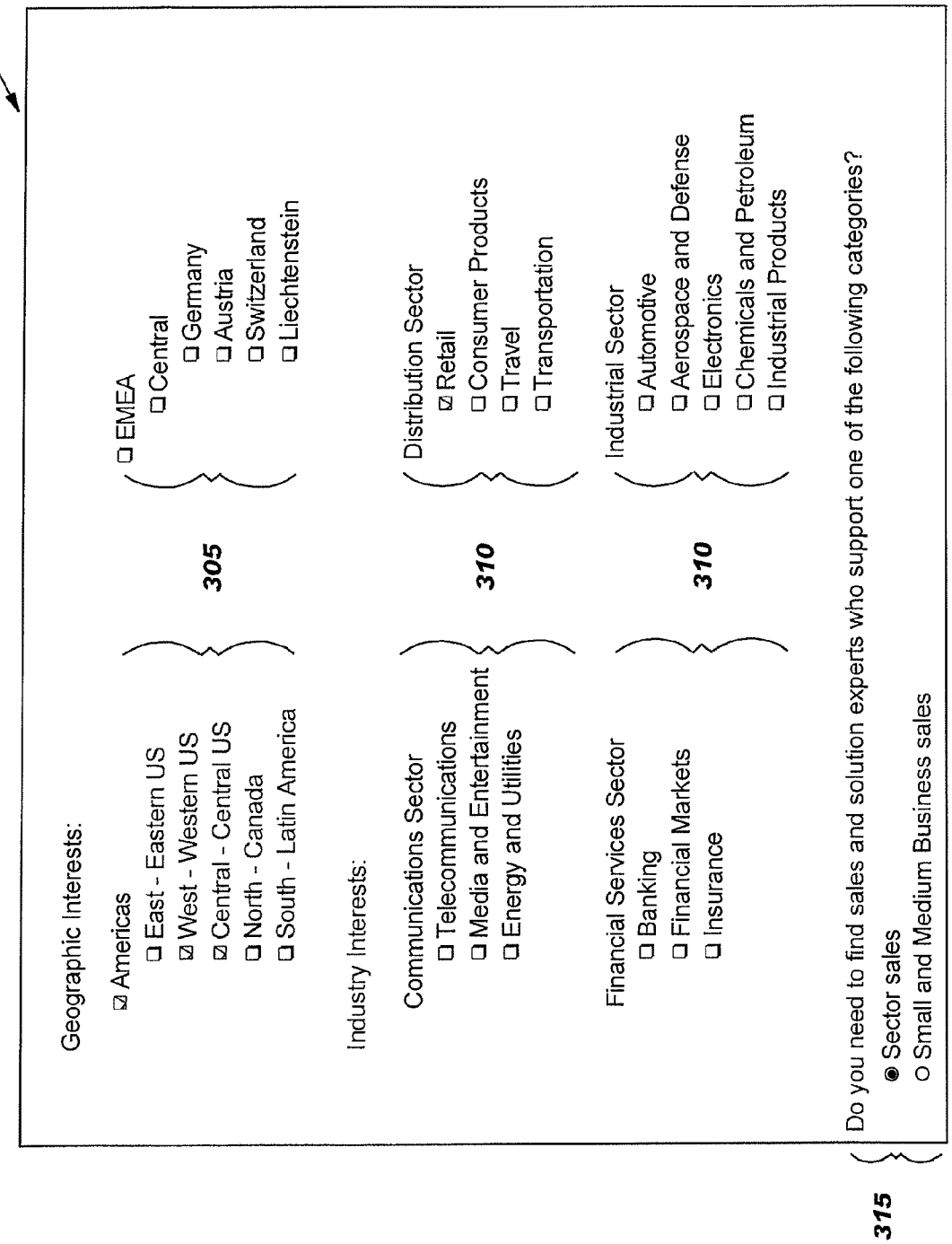
FIG. 3 is an embodiment of a graphical user interface (GUI) for prompting and receiving user profile information, according to the invention.

FIG. 3 is an embodiment of a graphical user interface (GUI) for prompting and receiving user profile information, generally denoted by reference numeral 300. As illustrated by FIG. 3, user profiles may be acquired by prompting a user for information or supplied by other entities when appropriate. A user profile may be created on the user workstation 110 whenever a new need arise to re-characterize the user's interests or responsibilities, including a first time or subsequent profiling. The GUI 300 may also be used by other proxy entities such as, for example, another person or organization responsible for assigning and defining a user's responsibilities or organization affiliation. Often, this may be a human resources department, or, perhaps, managers performing management functions.

As further shown in FIG. 3, the GUI 300 includes prompts 305, 310, and 315 for identifying such categories of interests as geographic, industry, or expert support for a user, respectively. These categories 305, 310, and 315 are illustrative examples and one of ordinary skill in the art would recognize that other similar categories are possible and contemplated by the invention. Each of these categories may be assigned a value which may then be used to create UPVs. In this illustrative example, selected geographic interests 305 include "West—Western US" and "Central—Central US." Selected industry interests 310 include "retail" and selected expert support 315 include "sector sales", in addition, the user may select small and medium business sales support. Selection of either expert support 315 option provides contact information as available such as email or phone contacts.

FIG. 4 is an illustrative embodiment of resulting user profile categories and characteristics shown illustratively in tabular format with supporting information, including selections of FIG. 3, and generally denoted by reference numeral 400. This tabulation compilation summarizes a user's profile and the table may be used to summarize the user's preferences and maintained in a database (e.g., by server 125). Also, each row of the table may be indicative of a user profile vector (the table collectively may also be known as the UPV). Included is user-id 405 that provides the user-id of the user profiled. A class identifier 410 denotes whether each entry of the profile is unclassified or classified. A classified indication enables security controls over activity associated with the information queries. An audience category 415 identifies the audience to which a specific row applies, in this example, a sector and relates to the expert contacts 315 of FIG. 3. A geographic identifier 420 denotes the geographic region that a particular row applies, and includes in this example, both "Americas" and "Global" indicators. Geographic information may be defined in hierarchical manner as to provide specific focus on geographic regions or countries.

Still referring to FIG. 4, a region category 425 provides an indication if a subset of the geographic region applies per row and in this example, includes both "West" and "Centr" (central) section of a geographic region. A country category 430 provides indications of particular countries, if applicable. In this example, no countries are indicated. A sector category 435 indicates which industry sector the profile is associated. In this example, "distribution" sector is selected. Other sectors may include, for example, but are not limited to, communications, financial services, public, industrial, or similar sectors. An industry category 440 provides an indication of the particular industry associated with a row. In this example, "retail" has been selected. Other sectors may include, for example, travel and transportation, consumer products, or the like. Any pre-defined interest dimension may be included in the user profile categories.

A language category 445 may be selected to denote which language that is desired for information to be presented. Any appropriate language is possible. A row status 450 indicates whether the row is new or not (i.e., "new" indicating a new interest) and may be used in conjunction with LST_Change_TM 455 (last change time) which may be a time stamp dating when the last update to this row occurred. If a row is new (i.e., row status 450=New), then this time stamp typically reflects a pre-selected date stamp (perhaps a NULL value) that causes content updates to a user to be non-constrained and any content information located in a search or query may be captured without limit to a previous update date, since no updates have previously occurred. In effect, this captures any and all relevant content information. On the other hand, if the row status 450 is marked as "updated", or similar marker, then the date filed in LST_CHANGE_TM 455 is used to limit a timeframe on any searches or queries for a user update. Only content that has been added or updated by a content provider since the last update period is relevant as a candidate for update to a user. The information of FIG. 4 may be maintained in a database (e.g., DB2, or the like) at the user's computer (e.g., 110) and passed to server 120 during a next query or access where a copy may also be maintained. Alternatively, the information of FIG. 4 may be maintained solely at server 120.

The values associated with geography 420 may reflect a hierarchical structure from greater to lesser breadth; geography is superior to region, which is in turn superior to country. All subordinate values may be proper subsets of superior values. For example, selection of a region implies a selection of geography as well as in conjunction with the region. Selection of a country implies selection of the region by itself as well as in conjunction with the country. User profile vectors may reflect this hierarchical structure so that a vector for each level of the hierarchy may be generated with more focused content associated with lesser breadth vectors (i.e., lower in the hierarchy).

The following is an illustrative extensible markup language (xml) listing reflective, in part, of the example of FIG. 3:

```
<?xml version="1.0" encoding ="VTF-8" standalone="yes"?>
- <userprofile>
    - <profkey profdate="2004-03-31 07:43:54.171">
        <Aud value="Sect"/>
          <Lang value="Eng" />
        - <Geo value="Americas">
            <Region value="Centr"/>
        </Geo>
            <Geo value="Global"/>
        - <Sect value="Distr">
            <Ind value="Retail" />
        </Sect>
    </profkey>
</userprofile>
```

The xml listing indicates that this form is completed "standalone" (e.g., on a users computer and not a server), the date of the profile is "Mar. 31, 2004 with time of "07:43:54.171." Other fields are created and defined such as the "Aud", "Lang", "Geo", "Region", "Ind" and "Sect" values as described in relation to FIG. 3. This information may be communicated to the server 125 (or alternatively, in embodiments, may be created directly on server 125) for describing a user profile.

FIG. 5 is an illustrative embodiment of a content publishing form (e.g., a GUI) for acquiring content categorization information, generally denoted by reference numeral 500. Content providers may employ the GUI 500 when publishing new content or updating or deleting old content. The form establishes categories that may include prompts 505 for selection of an industry sector and may include such categories, as for example, communications, distribution, financial systems, industrial, public, SMB EMEA (Small and Medium Business, Europe, Middle East and Africa), a predefined category, or the like.

Industry prompts 510 may select applicable industries that the content may be associated with such as, for example, consumer products, retail, travel and transportation, or the like. Geographies prompt 515 may select where to publish the content, for example, globally or specific geographies. If specific geographies, then specific geographies prompt 520 may select specific geographic preferences such as a geographic area (e.g., Americas, Asia Pacific, EMEA, or the like). Regions prompt 525 may select whether all regions or specific regions. If specific regions only is selected, then specific regions prompt 530 may select specific regions to limit geography (e.g., Americas—Central—Cent-ral US, Americas—East—Eastern US, Americas—North—Canada, Americas—South—Latin America, Americas—West Western US, or the like). One of ordinary skill in the art would recognize that any number of specific regions may be employed and that this is just one example.

A security classification prompt 535 may be selected to place additional access controls on the content, for example, unclassified (accessible to anyone), or, for example, classified, for access only by a specific company's employees. A content type prompt 540 may select the type of component such as news alerts, expert contacts, selling focus or other general classification of categories of the content.

FIGS. 6A and 6B are an embodiment of a content information table created to characterize a content object, generally denoted by reference numeral 600. This table may typically be maintained by server 125. The example of FIGS. 6A and 6B (FIG. 6B is a horizontal continuation of FIG. 6A) parallels the information obtained via the content publishing form of FIG. 5. Row 607 is a title row for each column, and each subsequent row 608a-f characterizes a content object and is "tagged" based on categories defined in this information table. Each row of the content information table defines a content tag vector (CTV).

Column 605 indicates whether the object (of a particular row) is classified or unclassified. In this example, all are unclassified. This indicator is used to compare with the classification of a user (i.e., unclassified or classified) and any classified content being restricted for access to an unclassified user. Column 610 indicates the audience of the content object and, in this example, all rows indicate "sector". Column 615 indicates the geography domain which may include, for example, Americas, Asia-Pacific, or EMEA, or the like. In this example, "Americas" has been selected. Column 620 indicates which specific regions are applicable, in this example, "Central" has been selected (i.e., Central US).

Column 625 indicates if a particular country is indicated and, in this example, no country has been indicated. Column 630 indicates with which sector(s) this content object is associated and, in this example, the sector indicates "distribution". Column 635 indicates which industry is indicated, in this example, "retail" has been indicated for all content objects. Column 640 indicates the language of the content object. Column 645 indicates the category of interest which a user may select to access this content object. For example, a category of query may be NewsAlerts or Expert contacts, or any other category of information. These categories may be used by a user to receive information associated and focused under these categories, as discussed below.

Column 650 provides the content name that is associated with the content object and may be any type of identifier such as, for example, a .gif file, html file, or similar file/object type. Column 655 indicates the content object path to where the content object may be located, typically a uniform resource locator (URL), or similar link. Column 660 indicates the current status of each of the content object and may include "new" or "deleted" statuses. Column 665 provides a time stamp either an initial value (e.g., NULL, or other known initial time value) if a new row or a time stamp of the last update for the content object associated with the row. This time stamp governs if and when an update to a user is to occur, as discussed below.

Referring now to FIG. 6B, row 607 continues the titles for each column, and the contents of row 608a is replicated (in this example, but may be different as necessary) for every remaining row 608b-608f. Column 670 indicates the URL or other navigable address for the object of each row. Column 675 provides a URL description for easy recognition and column 680 provides an application category associated with the content object which is employed when creating navigation pages for a user's convenience. Column 685 is an indicator denoting an intended use for the object; in this instance it reflects that the object is customer viewable (other options may be for example, sales force, internal use, employee viewable, etc). This indicator constrains a content object to a set of users as defined by a corporation or other controlling entity so that content may be kept confidential and limited to various sets of users.

Column 690 provides an Abstract of the object defined by each of the rows (608a-f).

Table 1 is an example of a hypertext markup language (html) listing.

TABLE 1

```
<HTML>
<HEAD>
<META NAME="APP_CATEGORY" CONTENT="News">
<META NAME="INDUSTRY" CONTENT="Retail">
<META NAME="INDUSTRY_DESC" CONTENT="Retail">
<META NAME="URL" CONTENT="../NonConf/NewsAlerts/JDSE-5LPL3A/JDSE-5LPLA3A.html">
<META NAME="URL_DESC" CONTENT="More retailers may look to start magazines">
<META NAME="INTENDED_USE" CONTENT="Customer Viewable">
<META NAME="ABSTRACT" CONTENT="A magazine venture between X-Mart Stores and
publisher X Inc. that is expected to be unveiled soon could help spawn a new generation of magazines
sold exclusively at specific stores, such as clothing retailers or even restaurants, industry experts say.
XXX.com
">
<META NAME="CREATE_DATE" CONTENT="07/17/2003 09:53:57 AM">
<TITLE>ContactPoint - News&Alerts - Distribution Sector: More retailers may look to start
magazines
</TITLE></HEAD>
<BODY TEXT="000000" BGCOLOR="FFFFFF">
<TABLE WIDTH="100%" BORDER=0 CELLSPACING=0 CELLPADDING=0>
<TR VALIGN=top><TD WIDTH="1%" BGCOLOR="FFFFFF"><IMG SRC="Image0.gif"
BORDER=0 HEIGHT=1 WIDTH=12 ALT=""><BR>
</TD></TR>
</TABLE>
<TABLE WIDTH="100%" BORDER=0 CELLSPACING=0 CELLPADDING=0>
<TR VALIGN=top><TD WIDTH="62%"><IMG SRC="Image1.gif" WIDTH=196 HEIGHT=45><BR>
<BR>
<FONT SIZE=5 COLOR="0000FF" FACE="Verdana">NEWS</FONT></TD><TD WIDTH="38%">
<TABLE WIDTH="100%" BORDER=0 CELLSPACING=0 CELLPADDING=0>
<TR VALIGN=top><TD WIDTH="31%"><DIV ALIGN=right><FONT SIZE=1 COLOR="0000FF"
FACE="Verdana">Geography:</FONT></DIV></TD><TD WIDTH="2%"><IMG SRC="Image0.gif"
BORDER=0 HEIGHT=1 WIDTH=1 ALT=""></TD><TD WIDTH="67%"><FONT SIZE=1
FACE="Verdana">Americas - Central -Central US</FONT></TD></TR>
```

The content of Table 1 in html may be created by the content submission tool 135 using tabularized data such as, for example, the tabulated data of FIGS. 6A and 6B. The html may be used, in embodiments, when searching of content is performed on the client workstation and typically not from a server. In this case, the content tagging and categorization may be conveyed via the html to the client workstation via the server 120 for creating navigation pages, or the like. The html is reflective of the content objects and/or CTV. One of ordinary skill in the art would recognize that this listing is just one example and other listings may also be equally feasible such as XML or standard generalized markup language (SGML).

The exemplary listing includes, in part, application category of "news" (reflective of Category 680), industry content of "retail" (reflective of Industry column 635), and geography (reflective of Geography column 615 and Region column 620). The html listing may also include other entries such as URL definition and description, Abstract for providing a brief description of the content object, and a creation date. Any column of FIGS. 6A and 6B may be represented in the html listing. This listing may be provided to a client workstation (e.g., 110) so that navigation pages may be built at the workstation for access to content information, and, in embodiments, provided as a service of the server 120.

Figure 7A:
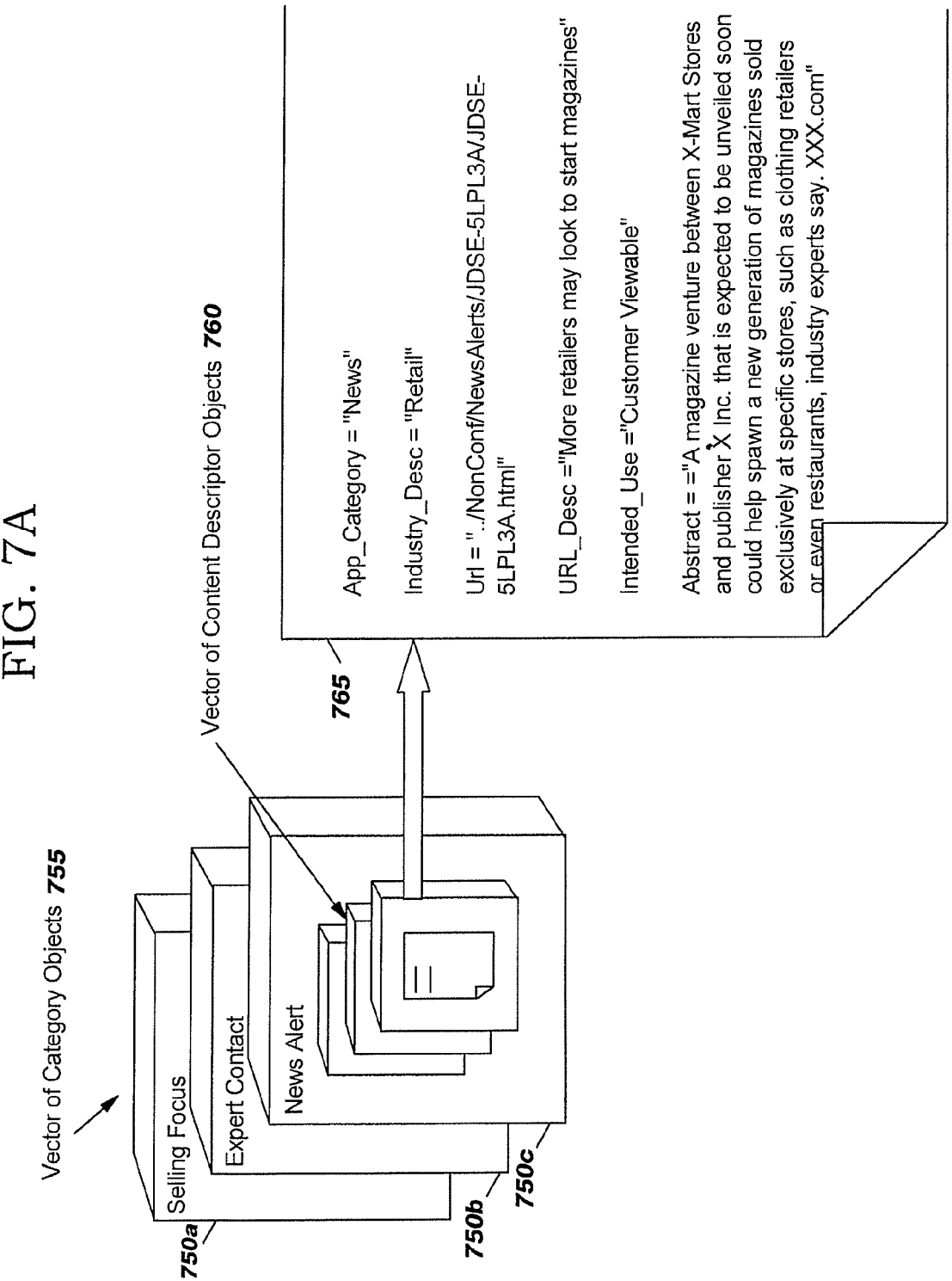
FIG. 7A is an illustrative diagram showing an exemplary logical organization of content based on a user's interests, classification or responsibilities, according to the invention.

FIG. 7A is an illustrative diagram showing an exemplary logical organization of content based on a user's interests, classification or responsibilities. When content is supplied to a user (or workstation) based on the user's profile and matching content (e.g., as provided by the processes of FIG. 2), the information may be organized into different presentations for a user's convenience and access. For example, referring to FIG. 7A, sets of information may be organized by application category based on content categories. The sets of information 750a-750c may be created according to useful topics (e.g., selling focus 705a, expert contacts 750b, or news alerts 750c) for ready and convenient access by a user.

Each set may be represented by a vector of category objects 755, as defined by column 645 of FIG. 6A. Each set includes a vector of content descriptor objects 760, e.g., for each row of FIGS. 6A and 6B, that summarizes each column of FIGS. 6A and 6B, and is contained within each App_Category object.

Figure 7B:
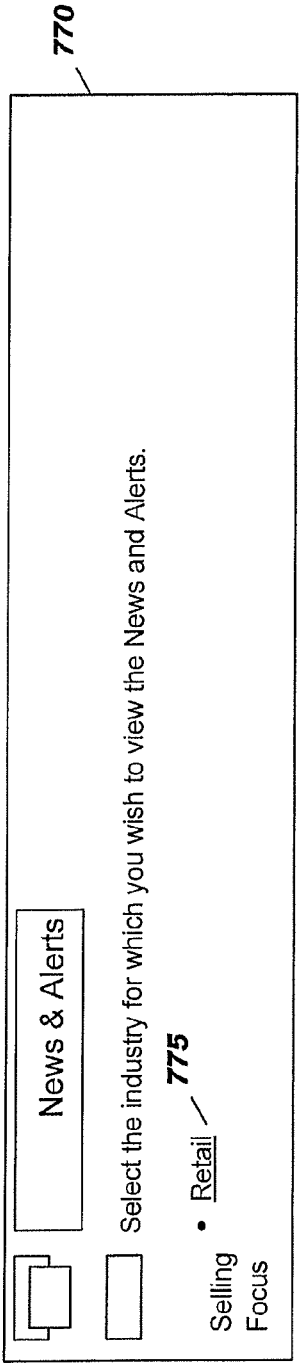
FIG. 7B is an embodiment of a GUI for navigating content, according to the invention.

FIG. 7B is an embodiment of a GUI for navigating content, generally denoted by reference numeral 770. The GUI shows that News and Alerts GUI has been selected by a user who may wish to see information pertaining to "News and Alerts." In this example, the only industry choice available for this user (e.g., due to the user's profile) is "Retail" 775. If, however, the user's profile indicated other industries, there would typically be choices on this GUI corresponding to those industries as well. It should be understood that there may typically be similar GUIs, not shown, for Selling Focus 750a and Expert Contacts 750b, for example, navigable to and from any other user GUI.

Figure 7C:
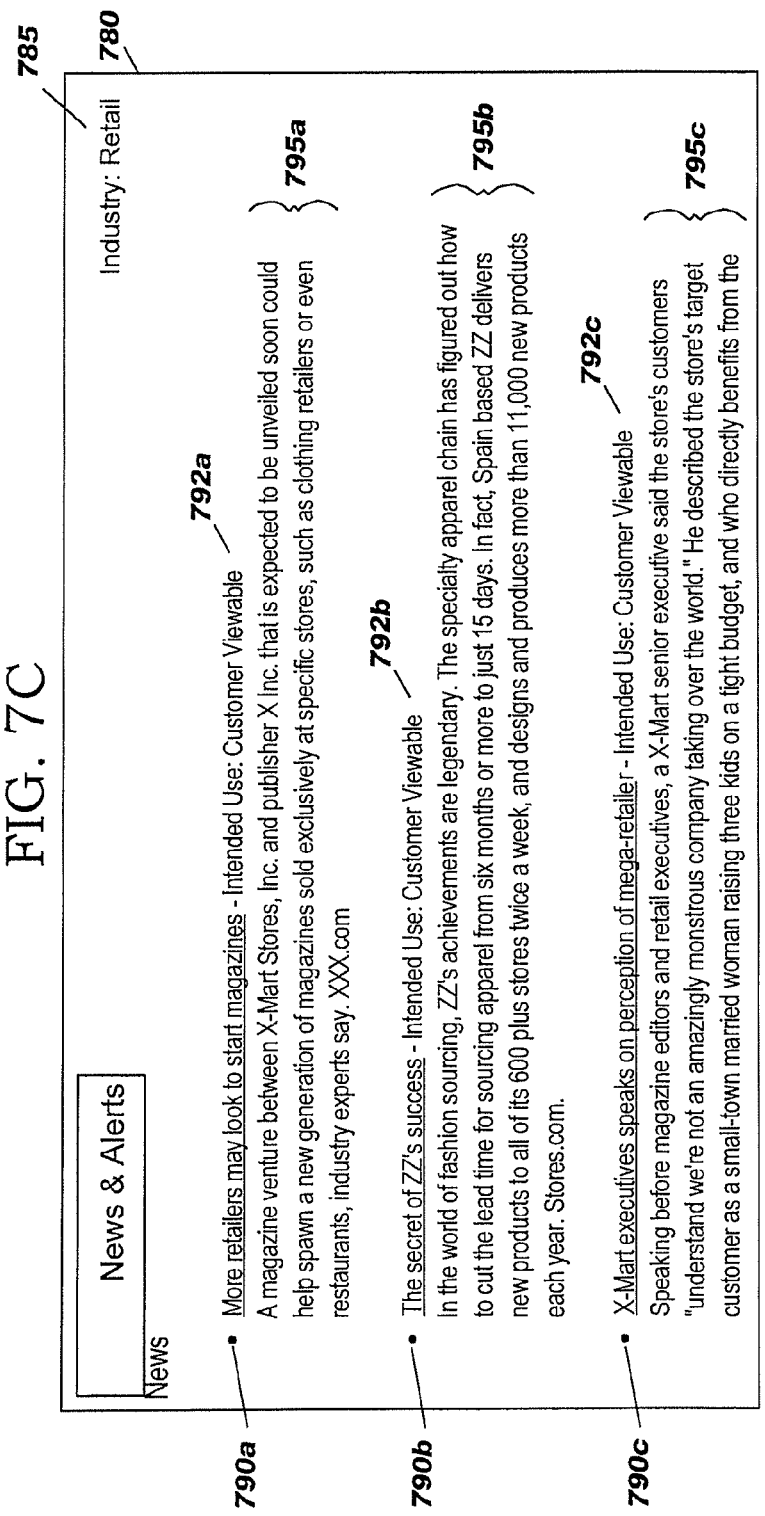
FIG. 7C is an embodiment of a navigation page, according to the invention.

FIG. 7C is an embodiment of a navigation page, generally denoted by reference numeral 780. This navigation page is reflective of the choice "Retail" 775 as designated by the Industry tag 785. This navigation page summarizes any news since the last time the user has been to this navigation page. Alternatively, this information may be kept until the user decides to release the information. The news is segregated by categories according to new content that has been matched against the user's profile (e.g., by processes 2A-2F). Further, navigation links 790a-790c are fully operative to be used as a navigation link by clicking on the link, for example, to the actual information either on the server 120 or other site, or in embodiments, on the client workstation 110, if downloaded. A synopsis of the "Intended Use" 792a-c, also provided corresponds to information of column 685 (FIG. 6B). Also, an "Abstract" 795a-c may be provided, corresponding to column 690 of FIG. 6B. One of ordinary skill in the art would recognize that any information may be included in the navigation page from FIGS. 6A and 6B, as appropriate, and that the features discussed herein are just one example. One of ordinary skill in the art would recognize that the navigation pages may be organized in different fashions with more navigation choices offered based on various values in the multiple columns of FIGS. 6A and 6B. The navigation pages may be constructed in a hierarchical manner, for example, with different sequences based on the particular situation of users.

In embodiments, the examples of FIGS. 7A, 7B and 7C may be implemented and executed from either a server, in a client server relationship, or they may run on a user workstation with operative information conveyed to the user workstation to create the navigation pages of FIGS. 7B and 7C.

Figure 8:
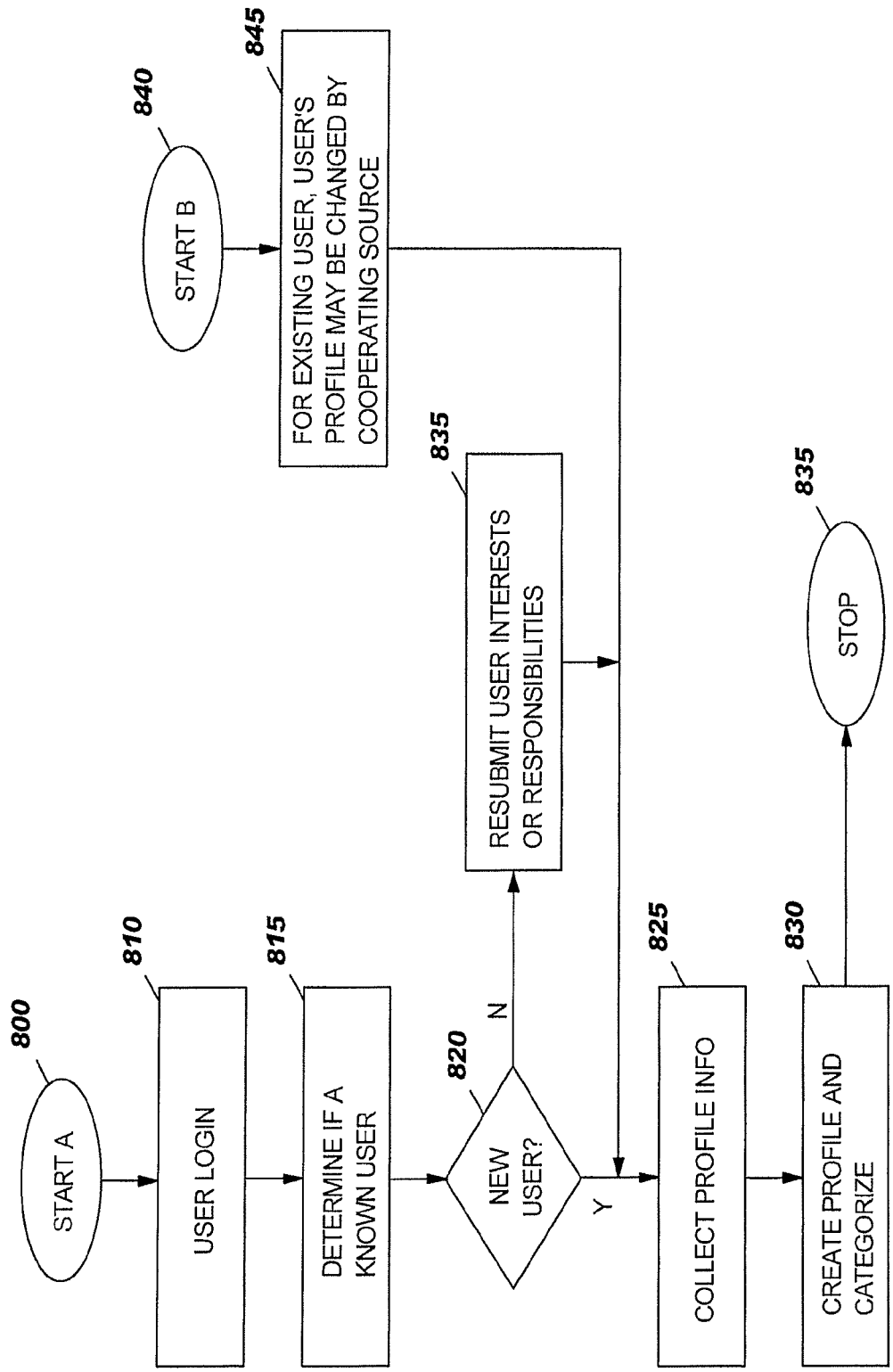
FIG. 8 is an embodiment of the invention showing steps of user categorization.

FIG. 8 is an embodiment of the invention showing steps of user categorization, beginning at step 800, or alternatively, at step 840. At step 805, a user logs into a website or server providing a unique identifier. This unique identifier may be a user ID or account number, for example. At step 815, the user identifier is compared to a database table to determine if this is a known user. At step 820, a check is made if the user is a new user or a known user. If not a new user, at step 835, the user's updated interests (and/or responsibilities) may be resubmitted. If however, there is a new user, then the process continues at step 825. Alternately, entry to this process may be via step 840 for existing users and for access by a cooperating source or proxy.

At step 845, a user's profile may be updated and changed by a cooperating source or proxy (e.g., another department or management) on behalf of the user. At step 825, user information is collected, such as user interests or responsibilities, typically using a form. At step 830, a profile of the user is created and categorized and stored in a database table. This profile categorizes the user's interest and/or responsibilities and may be time stamped for each unique combination of interest categories. The time stamp indicates the last time the user received an update for content that matches the combination of interest categories. When a new interest is created, the time stamp is set to a known initialized value (e.g., a NULL value) which subsequently causes all matching content (i.e., all relevant content for that category) to be provided, essentially regardless of content dates so that a baseline of content information is provided to a user. The process ends at step 835.

Figure 9:
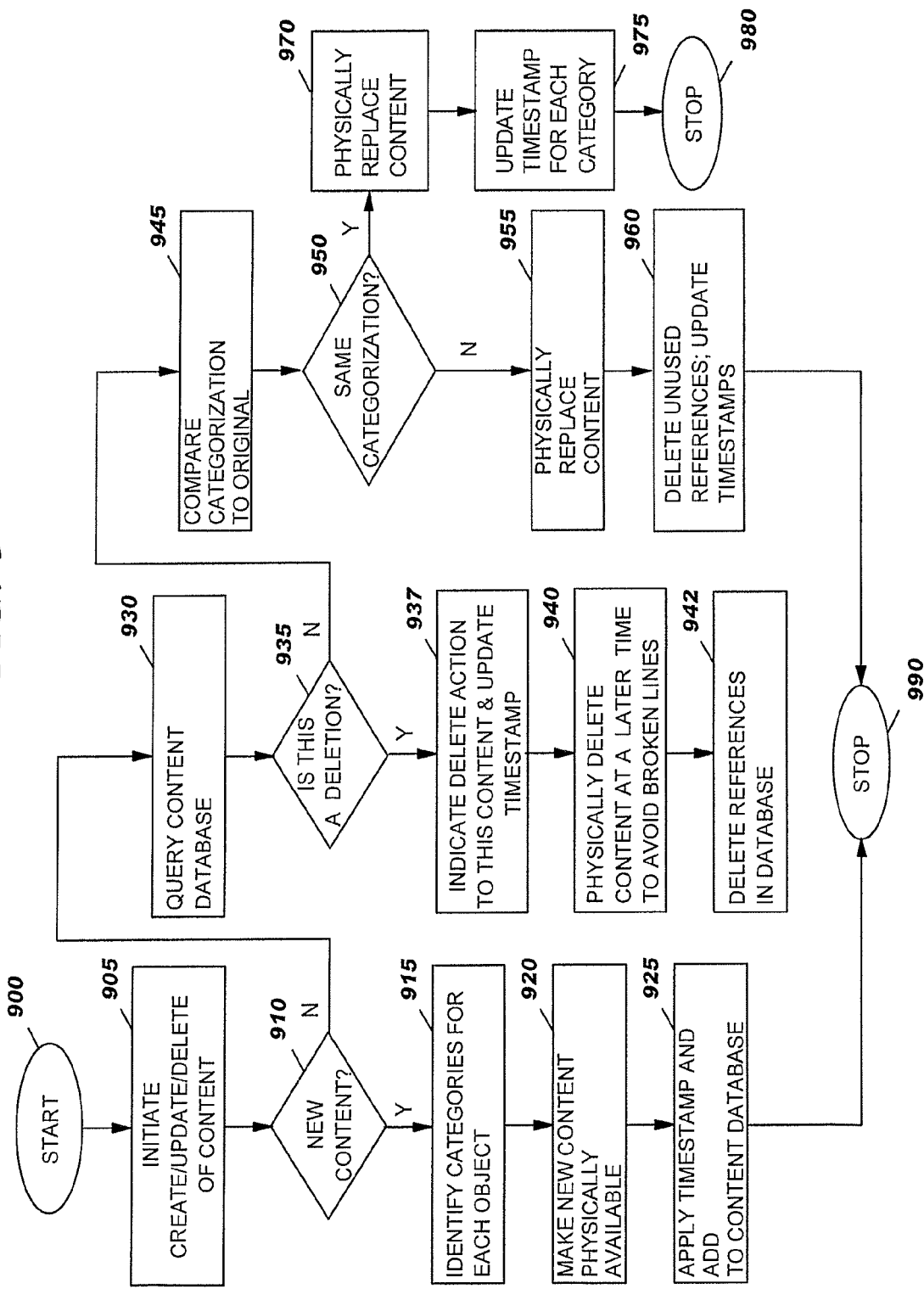
FIG. 9 is an embodiment of the invention showing steps of content categorization.

FIG. 9 is an embodiment of the invention showing steps of content categorization, beginning at step 900. At step 905, an information content (e.g., video, text, documents, files, animation, media, or the like) provider initiates creation, modification, update, or deletion of content typically using a content submission toolset, typically via a content categorization form. At step 910, a check is made whether the user has created new content. If so, then at step 915, applicable interest categories are identified for each piece of content, typically using the form provided by the submission toolset. Alternatively, in embodiments, the categories may be identified as a post creation process. At step 920, the content is physically made available on a website, library, or database, for example. At step 925, the combination of interest categories associated with each piece of content are entered into a content information database with a time stamp for indicating when the content was last altered (or created if the first instance). Every primitive piece of content may be assigned a timestamp. The process ends at step 990.

If, however, it is not new content at step 910, for example, an update of category or deletion, then at step 930, a query of the content data table is made to find combinations of interests categories associated with each piece (or object) of content. At step 935, a check is made whether this is a deletion of content. If so, then at step 937, an indication that a delete action is made typically in the content data table and the content time stamp is updated. This delete indication may prevent new users from having deleted entries built into their navigation pages. At step 940, at a time different from step 937 (for example, an hour, day, or other time base) the content is physically deleted. The time difference provides a reasonable assurance that if a user is currently accessing/using the content during a session, no broken links to the content will occur during the current session; that is, the user currently has a working link and expects it to work in accessing the content during the current session. At step 942, references to the deleted content object or piece of content may be deleted in the content database. The process ends at step 990.

If, however, it there is not a deletion at step 935 such as re-categorization or time stamp update, then at step 945, the categorization of the submitted content categorization form is compared with the stored categorization of each piece of content. At step 950, a check is made whether each piece is the same categorization. If yes, then at step 970, the changed content is physically replaced for each piece of content. At step 975, the timestamp is updated in the content database for each piece of content. The process ends at step 980.

If not the same categorization at step 950, such as re-aligning content into new/different categories, then at step 955, each re-categorized content is physically replaced. At step 960, unused references are deleted from the content information database and any new references are added. Timestamps are updated. The process ends at step 990.

Figure 10:
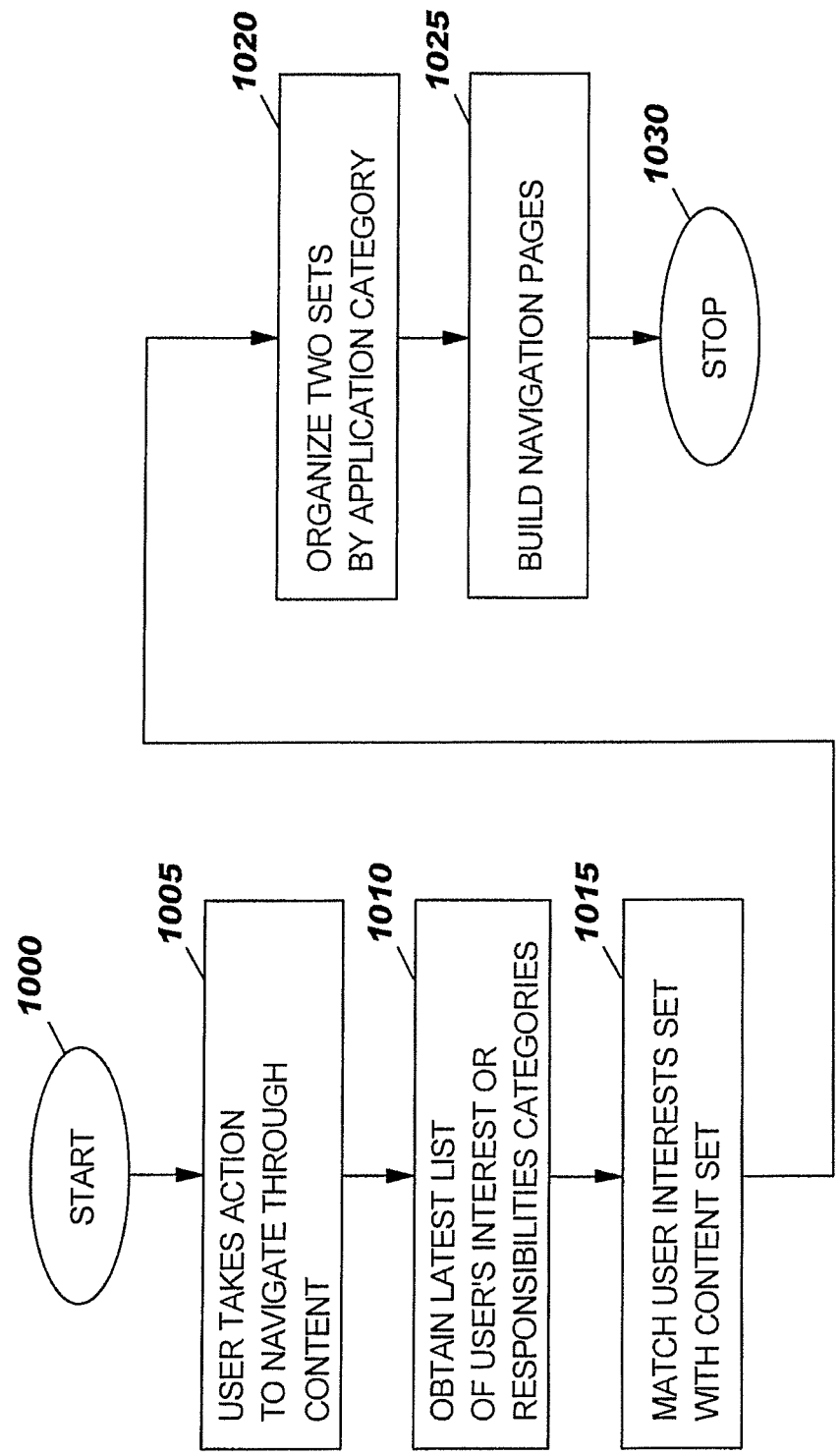
FIG. 10 is an embodiment of the invention showing steps of categorization matching.

FIG. 10 is an embodiment of the invention showing steps of categorization matching, beginning at step 1000. At step 1005, a user takes action to navigate through content by, for example, logging onto a server or selecting a navigation link. At step 1010, the latest list or set of user's interests or responsibility categories is queried from a database maintaining the user's profile. At step 1015, a query to obtain the latest list of categories from a content information database that match the user's interest profile categories is issued. At step 1020, the two resulting sets are organized by application category in anticipation of building navigation pages. At step 1025, navigation pages are built from the organized content and user's interest information. The process ends at step 1030.

FIG. 11 is an embodiment of the invention showing steps of categorization matching on a client, beginning at step 1050. In different implementations, content category information may be obtained from different sources. When content objects are initially built, the content categorization may be defined via meta tags that are within each content object's corresponding html file. At step 1055, content objects and corresponding html files defining the content categorization via meta tags are sent to a client. At step 1060, a user's interest set is matched with the content set using the meta tags in each object. At step 1065, the two resulting sets are organized by application category in anticipation of building navigation pages. At step 1070, navigation pages are built from the organized content and user's interest information. The process ends at step 1075.

While the invention has been described in terms of embodiments, those skilled in the art will recognize that the invention can be practiced with modifications and in the spirit and scope of the appended claims.

What is claimed:

1. A method for managing content information, comprising:
  acquiring user profile information using a graphical user interface (GUI) that displays selectable categories to a user;

defining one or more user profile vectors (UPVs) based on the user profile information defined by selected ones of the categories;

acquiring content categorization information using a content publishing form that displays selectable content category prompts to a provider of content objects;

defining one or more content tagging vectors (CTVs) based upon the content categorization information;

generating a list of matching content identifiers (MCIs) that is associated with relevant content information by comparing the one or more UPVs and the one or more CTVs;

determining whether the relevant content information is already present on a user workstation by comparing the list of MCIs with stored content identifiers (SCIs) that reflect content that is on the user workstation;

retrieving the relevant content information based on the comparison of the list of MCIs with the SCIs; and updating the user workstation with the retrieved relevant content information upon a triggering event.

2. The method of claim 1, wherein the categories represent a substantially common categorization scheme.

3. The method of claim 2, wherein the categorization scheme includes a hierarchical structure of one or more categories.

4. The method of claim 1, wherein the categories include one of an industry category, a geography category, a region category, a predefined category, a security indication, and a content type.

5. The method of claim 1, wherein the triggering event includes at least one of a user log-on, a scheduled process, a change in user profile, a change in content information, and a difference in a time stamp.

6. The method of claim 1, wherein the user profile information contains information of at least one of a user's interests, a user's responsibilities, and a security classification.

7. A system for providing categorized information to a user, the system comprising:
    a computer device;
    a computer readable hardware memory storage device;
    program code storeed on the computer readable hardware memory storage device for execution by the computer device, the program code comprising:
        program code that acquires user profile information using a graphical user interface (GUI) that displays selectable categories to a user;
        program code that tags a user profile having descriptors of at least a user's interests and a user's responsibilities with at least one of a time stamp and one or more categories;
        program code that defines one or more user profile vectors (UPVs) based on the user profile information defined by selected ones of the selectable categories;
        program code that acquires content categorization information using a content publishing form that displays selectable content category prompts to a provider of content objects;
        program code that defines one or more content tagging vectors (CTVs) based upon the content categorization information;
        program code that compares the one or more UPVs and the one or more CTVs to generate matching content identifiers (MCIs) which are associated with relevant content information;
        program code that compares the list of MCIs with stored content identifiers (SCI) for determining whether the relevant content information is already present on a user workstation;
        program code that detects a change in at least one of the user profile and the relevant content information based on at least one of the time stamp and the one or more categories; and
        program code that updates a workstation based on the detected change.

8. The system of claim 7, wherein the one or more categories include at least one of a geographic category, a predefined category, and an industry category.

9. The system of claim 8, wherein the one or more categories are hierarchical.

10. The system of claim 7, wherein the program code further comprises program code that detects a deletion of an information content object, and as a result, deletes references to the deleted information content object at a time different from a physical deletion of the information content object.

11. The system of claim 7, wherein:
    the detecting the change in the relevant content information is based on the one or more categories and
    the program code further comprises program code that physically replaces the relevant content information at time substantially different from deletion of unused references to the relevant content information.

12. The system of claim 7, wherein the program code further comprises program code that updates the time stamp when at least one of the content object changes, the category of the content object changes and the user profile changes.

13. The system of claim 7, wherein the program code further comprises program code that creates navigation pages comprising at least one of a link to an information content site, an abstract of the information content, and a security indication.

14. The system of claim 7, wherein the program code further comprises program code that sends the information content to a workstation using meta tags for building navigation pages on a workstation.

15. A computer program product comprising a computer usable storage device having computer readable program code stored on the computer usable storage device, the program code comprising:
    program code that acquires user profile information using a graphical user interface (GUI) that displays selectable categories to the user;
    program code that defines one or more user profile vectors (UPVs) based on the user profile information defined by selected ones of the categories;
    program code that acquires content categorization information using a content publishing form that displays selectable content category prompts to a provider of content objects;
    program code that defines one or more content tagging vectors (CTVs) based upon the content categorization information;
    program code that compares the one or more UPVs and the one or more CTVs to generate a list of matching content identifiers (MCIs) which is associated with relevant content information;
    program code that provides the relevant content information based on a triggering event;
    program code that compares the list of MCIs with stored content identifiers (SCIs) for determining whether the relevant content information is already present on a user workstation; and program code that retrieves the relevant content information based on the comparison of the list of MCIs with the SCIs.

16. The computer program product of claim 15, wherein the program code further comprises program code that maintains a table based on the user profile information acquired from the GUI, and wherein each row of the table includes:
   a user-id;
   a classification identifier that denotes classified or unclassified;
   an audience identifier;
   a geographic identifier;
   a row status identifier indicating whether the row is new; and
   a last change time identifier including a time stamp defining when a last update to the row occurred.

17. The computer program product of claim 16, wherein each row of the table is indicative of one of the UPVs.

18. The computer program product of claim 15, wherein the user profile information is a submission of a user profile for compiling the one or more UPVs, the user profile containing information of at least one of the user's interests, the user's responsibilities, and a security classification.

* * * * *